(12) United States Patent
DiMascio et al.

(10) Patent No.: US 11,164,562 B2
(45) Date of Patent: Nov. 2, 2021

(54) ENTITY-LEVEL CLARIFICATION IN CONVERSATION SERVICES

(71) Applicant: INTERNATIONAL BUSINESS MACHINES CORPORATION, Armonk, NY (US)

(72) Inventors: Carmine M. DiMascio, West Roxbury, MA (US); Donna K. Byron, Petersham, MA (US); Benjamin L. Johnson, Baltimore City, MD (US); Florian Pinel, New York, NY (US)

(73) Assignee: International Business Machines Corporation, Armonk, NY (US)

(*) Notice: Subject to any disclaimer, the term of this patent is extended or adjusted under 35 U.S.C. 154(b) by 380 days.

(21) Appl. No.: 16/245,051

(22) Filed: Jan. 10, 2019

(65) Prior Publication Data

US 2020/0227025 A1 Jul. 16, 2020

(51) Int. Cl.
*G10L 15/06* (2013.01)
*G10L 15/22* (2006.01)
*G06F 40/279* (2020.01)

(52) U.S. Cl.
CPC .......... *G10L 15/063* (2013.01); *G06F 40/279* (2020.01); *G10L 15/22* (2013.01); *G10L 2015/225* (2013.01)

(58) Field of Classification Search
CPC . G10L 15/063; G10L 15/22; G10L 2015/225; G10L 15/04; G10L 15/10; G10L 15/1815; G10L 15/197; G10L 15/24; G10L 15/30; G10L 25/78; G06F 40/279; G06F 40/35; G06F 16/367; G06F 16/3329; G06F 16/3322; G06F 16/36; G06F 21/552;
(Continued)

(56) References Cited

U.S. PATENT DOCUMENTS 8,229,734 B2 7/2012 Bennett
9,009,046 B1 * 4/2015 Stewart .................. G10L 15/08
704/251
(Continued)

FOREIGN PATENT DOCUMENTS

CN 104408639 A 3/2015
WO 2017112813 A1 6/2017

OTHER PUBLICATIONS

Anonymously, "System and Method for a Dynamic Mashup of a Question Answering System with Integrated Internet Search," IPCOM000236029D, Apr. 2, 2014, 3 pages.
(Continued)

*Primary Examiner* — Abdelali Serrou
(74) *Attorney, Agent, or Firm* — Conley Rose, P.C.

(57) ABSTRACT

A system for entity-level clarification in conversation services includes a memory having instructions therein. The system also includes at least one processor in communication with the memory. The at least one processor is configured to execute the instructions to receive a conversation services training example set, build an entity usage map using the conversation services training example set, receive a user utterance, and, responsive to a reception of the user utterance, generate a clarification response using the entity usage map. The at least one processor is also configured to execute the instructions to provide the clarification response to a user.

11 Claims, 6 Drawing Sheets

(58) Field of Classification Search
CPC ........ G06F 21/50; G06F 21/55; G06F 21/554; G06F 21/566; G06F 21/577

See application file for complete search history.

(56) References Cited

U.S. PATENT DOCUMENTS

| | | | |
|---|---|---|---|
| 9,785,672 B2* | 10/2017 | Li | G06F 16/248 |
| 10,067,938 B2* | 9/2018 | Bellegarda | G06F 40/289 |
| 10,176,167 B2* | 1/2019 | Evermann | G06F 40/35 |
| 10,236,017 B1* | 3/2019 | Witt-Ehsani | G06F 40/216 |
| 10,733,375 B2* | 8/2020 | Li | G06N 3/08 |
| 10,839,159 B2* | 11/2020 | Yang | G06N 5/022 |
| 10,854,206 B1* | 12/2020 | Liu | G06K 9/00288 |
| 10,957,311 B2* | 3/2021 | Solomon | G06T 7/60 |
| 2012/0095835 A1 | 4/2012 | Makar et al. | |
| 2012/0265528 A1* | 10/2012 | Gruber | G10L 15/183 704/235 |
| 2012/0265787 A1* | 10/2012 | Hsu | G06F 16/3322 707/780 |
| 2012/0303356 A1* | 11/2012 | Boyle | G06F 40/30 704/9 |
| 2013/0110505 A1* | 5/2013 | Gruber | G06F 3/167 704/9 |
| 2013/0275164 A1* | 10/2013 | Gruber | G10L 17/22 705/5 |
| 2014/0278413 A1* | 9/2014 | Pitschel | G10L 15/22 704/243 |
| 2016/0196499 A1 | 7/2016 | Khan et al. | |
| 2016/0352658 A1 | 12/2016 | Capper et al. | |
| 2017/0228367 A1 | 8/2017 | Pasupalak et al. | |
| 2018/0012232 A1* | 1/2018 | Sehrawat | G06F 21/31 |
| 2018/0174578 A1* | 6/2018 | Bangalore | G06F 40/137 |
| 2018/0232376 A1* | 8/2018 | Zhu | G06F 40/35 |
| 2018/0253638 A1* | 9/2018 | Maga | G10L 15/22 |
| 2018/0314689 A1* | 11/2018 | Wang | G10L 15/07 |
| 2018/0359132 A1* | 12/2018 | Salameh | G06N 3/0454 |
| 2019/0057157 A1* | 2/2019 | Mandal | G06F 16/3329 |
| 2019/0370604 A1* | 12/2019 | Galitsky | G06N 5/003 |
| 2019/0377544 A1* | 12/2019 | Darachi, Jr. | G10L 15/22 |
| 2020/0219487 A1* | 7/2020 | Shibuya | G10L 25/78 |

OTHER PUBLICATIONS

Singh, "Chat Bots—Designing Intents and Entities for your NLP Models," https://medium.com/@brijrajsingh/chat-bots-designing-intents-and-entities-for-your-nlp-models-35c385b7730d, downloaded from the Internet Nov. 14, 2018, pp. 1-8.

"Entity Extraction: How Does It Work?" https://www.expertsystem.com/entity-extraction-work/, downloaded from the Internet Nov. 14, 2018, pp. 1-9.

"How Intent Classification Works in NLU," Natural Language Processing, https://mrbot.ai/blog/natural-language-processing/understanding-intent-classification/, Sep. 2, 2018, pp. 1-7.

"Intent Extraction," NLP Architect by Intel, AI Lab 0.3 Documentation,http://nlp_architect.nervanasys.com/intent.html, downloaded from the Internet Nov. 14, 2018, pp. 1-5.

"Intents Overview / Dialogflow," https://dialogflow.com/docs/intents, downloaded from the Internet Nov. 14, 2018, pp. 1-9.

"Knowledge Base," Wikipedia, downloaded from the Internet Nov. 13, 2018, pp. 1-3.

"Named Entity," Wikipedia, downloaded from the Internet Nov. 14, 2018, 1 page.

"NLP vs. NLU: What's the Difference?," Lola.com, https://medium.com/@lola.com/nlp-vs-nlu-whats-the-difference-d91c06780992, downloaded from the Internet Nov. 14, 2018, pp. 1-4.

"Planning Your Intents and Entities," IBM Cloud Docs, https://console.bluemix.net/docs/services/conversation/intents-entities.html, Jan. 9, 2018, pp. 1-2.

Nie, et al., "Statistical Entity Extraction from Web," Manuscript ID 0094-SIP-2011-PIEEE.R1, pp. 1-12.

"Stanford Log-linear Part-of-Speech Tagger," The Stanford Natural Language Processing Group, https://nlp.stanford.edu/software/tagger.shtml, downloaded from the Internet Nov. 14, 2018, pp. 1-7.

"What is a Chatbot and How to Use It for Your Business," Anadea, https://medium.com/swlh/what-is-a-chatbot-and-how-to-use-it-for-your-business-976ec2e0a99f, downloaded from the Internet Nov. 13, 2018, pp. 1-9.

Stitchbury, "What is an Ontology?," https://blog.grakn.ai/what-is-an-ontology-c5baac4a2f6c, downloaded from the Internet Nov. 12, 2018, pp. 1-8.

"WTF is a Knowledge Graph?," https://hackernoon.com/wtf-is-a-knowledge-graph-a16603a1a25f, downloaded from the Internet Nov. 12, 2018, pp. 1-10.

"Architecture—Gobblin Documentation," https://gobblin.readthedocs.io/en/latest/Gobblin-Architecture/, downloaded from the Internet Jan. 8, 2019, pp. 1-10.

* cited by examiner

ENTITY-LEVEL CLARIFICATION IN CONVERSATION SERVICES

BACKGROUND

The present disclosure relates generally to cognitive digital assistant (CDA) systems. Today's CDAs, such as Apple's Siri® and Amazon's Alexa®, are typically programmed with artificial intelligence (AI), machine learning, and voice recognition technology. The AI programming of some CDAs has included sophisticated algorithms for learning from user inputs and becoming better at predicting user needs. Nevertheless, the failure modes implemented in CDAs have typically been very high-level rather than granular. Some CDAs might produce the same "I don't understand that" in response to far off-topic inputs as they do in response to commands that call for capabilities that are much closer, yet also not identical, to capabilities that they have been trained to provide.

SUMMARY

A method for entity-level clarification in conversation services is disclosed. The method includes receiving a conversation services training example set, building an entity usage map using the conversation services training example set, receiving a user utterance, and, responsive to receiving the user utterance, generating a clarification response using the entity usage map. The method also includes providing the clarification response to a user.

A system for entity-level clarification in conversation services is disclosed. The system includes a memory having instructions therein. The system also includes at least one processor in communication with the memory. The at least one processor is configured to execute the instructions to receive a conversation services training example set, build an entity usage map using the conversation services training example set, receive a user utterance, and, responsive to a reception of the user utterance, generate a clarification response using the entity usage map. The at least one processor is also configured to execute the instructions to provide the clarification response to a user.

A computer program product for entity-level clarification in conversation services is disclosed. The computer program product includes a computer readable storage medium having program instructions embodied therewith. The program instructions are executable by at least one processor to cause the at least one processor to receive a conversation services training example set, build an entity usage map using the conversation services training example set, receive a user utterance, and, responsive to a reception of the user utterance, generate a clarification response using the entity usage map. The program instructions are also executable by the at least one processor to cause the at least one processor to provide the clarification response to a user.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry that is configured to perform a specific task. For example, a module may be comprised of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" means to send and/or receive data over a communication link. The communication link may include both wired and wireless links, and may be a direct link or may comprise multiple links passing through one or more communication networks or network devices such as, but not limited to, routers, firewalls, servers, and switches. The communication networks may be any type of wired or wireless network. The networks may include private networks and/or public networks such as the Internet. Additionally, in some embodiments, the term communicate may also encompass internal communication between various components of a system and/or with an external input/output device such as a keyboard or display device.

A chatbot (also known as a talkbot, chatterbot, bot, instant messaging (IM) bot, interactive agent, or artificial conversational entity) is a CDA that is capable of having a conversation with a user via auditory or textual methods. A typical chatbot may be setup (i.e., "trained") to respond to an audible user utterance and/or a textual user utterance (referred to herein as a "user utterance," "utterance," "question," "query," "request," or "command") using a service API or a corpus of documents. Such training typically requires a developer or a user to map one or more API functions or document passages to each of a number of conversation intents that the chatbot may be asked to act upon or otherwise respond to. A conversation intent (referred to herein as an "intent") represents a mapping between a user utterance and a desired responsive action (referred to herein as a "response" or "answer") of the chatbot. A conversation entity (referred to herein as an "entity") represents a term or object in a user utterance that provides clarification or specific context for a particular intent. Intents may be thought of as verbs (i.e., something a user wants to do), while entities may be thought of as nouns (such as the object of, or the context for, an action). Entities make it possible for a single intent to be associated with multiple specific actions. For example, the entities "me," "flight," "reservation," and "restaurant" can make it possible for the intent "get" to be used for making travel arrangements (e.g., "get me a flight reservation") and/or for making dinner plans (e.g., "get me a restaurant reservation"). An entity may also define a class and/or sub-class of objects, with specific values representing possible objects in the class and/or sub-class. For example, a "train," a "bus," and a "taxi" may all be specific values or instances within the "public" sub-class or type of the "transportation" class. Aspects of the present disclosure prompt a chatbot user for clarification in response to an utterance that the chatbot cannot understand or has not been specifically trained to act upon.

Figure 1:
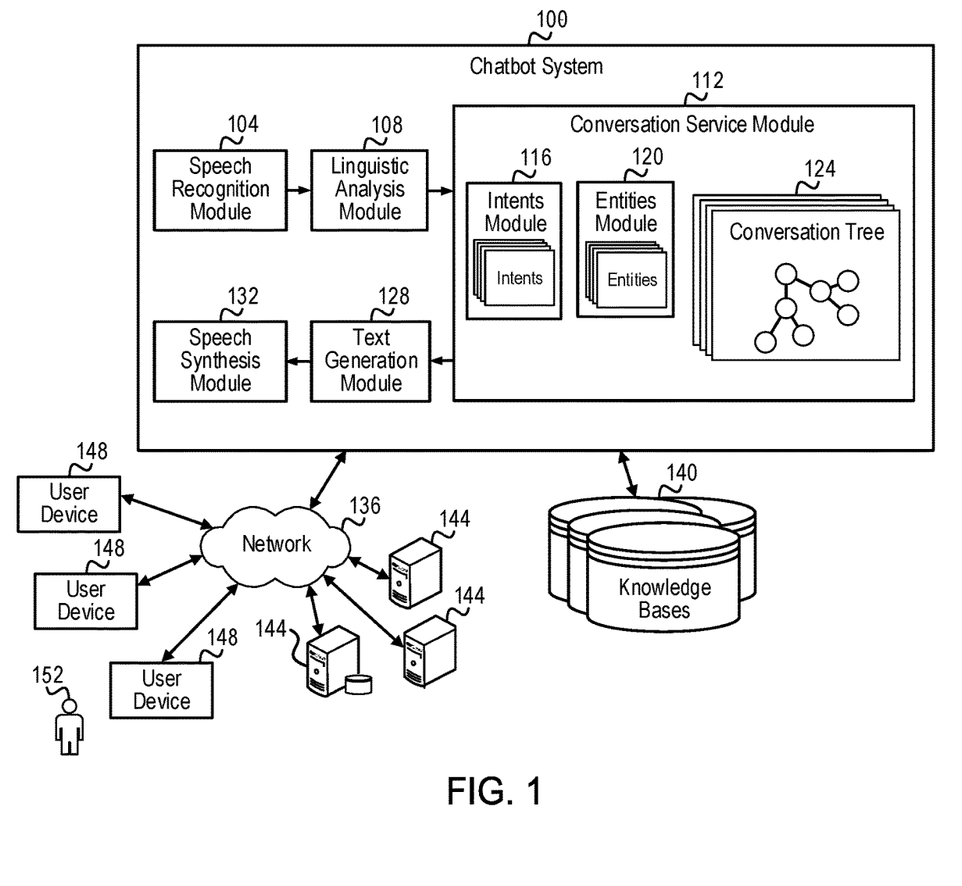
FIG. 1 is a block diagram illustrating a chatbot system in accordance with aspects of the present disclosure.

FIG. 1 is a block diagram illustrating a chatbot system 100 in accordance with aspects of the present disclosure. Additionally, it should be appreciated that IBM®DWatson™ Assistant and other conversation services provide tools for building good natural language understanding (NLU) components for a chatbot. In accordance with aspects of the present disclosure, the chatbot system 100 is configured to respond to one or more user utterances received from one or more user devices 148 over a network 136. The network 136 may be any type of network that enables the chatbot system 100 to communicate with the one or more user devices 148 as well other devices such as network devices 144. The network devices 144 may be other servers, databases, or applications that provide one or more services to the chatbot system 100. For example, the network 136 may comprise various networks including wired and wireless networks such as, but not limited to, one or more radio networks (e.g., cellular network or mobile network), local area networks (LANs), wide area networks (WANs), and metropolitan area networks (MANs), etc. The network 136 may also include both private networks and public networks such as the Internet.

Each of the user devices 148 is any type of electronic device that may be used by a user 152 to interact with the chatbot system 100. Non-limiting examples of the user devices 148 include a personal computer (desktop or laptop), mobile devices (e.g., personal digital assistant (PDA), smart phone, tablet), cognitive voice assistant devices (e.g., Amazon's Alexa® or Google Home® devices), and Internet of Things (IoT) devices such as, but not limited to, vehicles, home appliances and other items embedded with electronics, software, sensors, actuators, and connectivity which enables these objects to connect and exchange data. In accordance with aspects of the present disclosure, the chatbot system 100 is configured to enable auditory communications as well as textual communications with the user 152 via the one or more user devices 148.

The chatbot system 100 is configured to store information into and receive information contained in one or more knowledge bases 140. The chatbot system 100 may communicate with the knowledge bases 140 via a direct communication link or over the network 136. Each of the knowledge bases 140 is a repository of information that may comprise a knowledge graph and a corpus of documents such as, but not limited to, publications, books, magazines, articles, research papers, online content, and other data to enable the chatbot system 100 to respond to user utterances in accordance with aspects of the present disclosure. A knowledge graph is the representation of a domain of knowledge that is based on a graph data structure with nodes and edges that link related data such as facts, people, and places together. Non-limiting examples of knowledge graphs include Yago™ and/or Freebase™. The chatbot system 100 may also be configured to communicate with the one or more network devices 144 for gathering information pertaining to a user utterance.

In accordance with aspects of the present disclosure, the chatbot system 100 comprises a speech recognition module 104, a linguistic analysis module 108, a conversation service module 112, a text generation module 128, and a speech synthesis module 132. The speech recognition module 104 is configured to perform feature extraction to recognize audible and textual words and word sequences in a user utterance. The speech recognition module 104 may convert the user utterance from an analog form to digital form. The speech recognition module 104 may utilize an acoustic model and/or a stochastic language model to determine the probabilities of word sequences.

The linguistic analysis module 108 may be configured to employ syntactic and semantic analysis and/or other natural language processing (NLP) or NLU techniques to determine optimal word sequences, phrase structure, and to interpret audible user utterances and/or textual user utterances. In accordance with aspects of the present disclosure, the linguistic analysis module 108 analyzes user utterances for intents and entities, and provides such data to the conversation service module 112.

In accordance with aspects of the present disclosure, the conversation service module 112 is configured to determine a response to a user utterance. The depicted conversation service module 112 includes an intents module 116 comprising a set of one or more intents, an entities module 120 comprising a set of one or more entities, and a set of one or more conversation trees 124. Each of the conversation trees 124 defines the flow of a conversation in the form of a logic tree. Each node of the tree has a condition that triggers it, based on a user utterance. For example, one of the conversation trees 124 may be for enabling a user to search for and reserve a hotel room. Another one of the conversation trees 124 may be for enabling a user to perform banking operations. By recognizing the intent(s) and entity(ies) expressed in a user utterance, the conversation service module 112 can choose the correct dialog flow and correct application/intent to call for responding to the utterance.

The text generation module 128 is configured to receive responses to user utterances from the conversation service module 112 and to convert the responses into a data that represents corresponding textual information suitable for the requesting one of the user devices 148. Hence, once a response to a user utterance is determined by the conversation service module 112, the chatbot system 100 may provide a textual response using the text generation module 128. And the speech synthesis module 132 is configured to convert the textual data from the text generation module 128 into an audible form. Hence, via the speech synthesis module 132, the chatbot system 100 may also provide an audible response.

Figure 2:
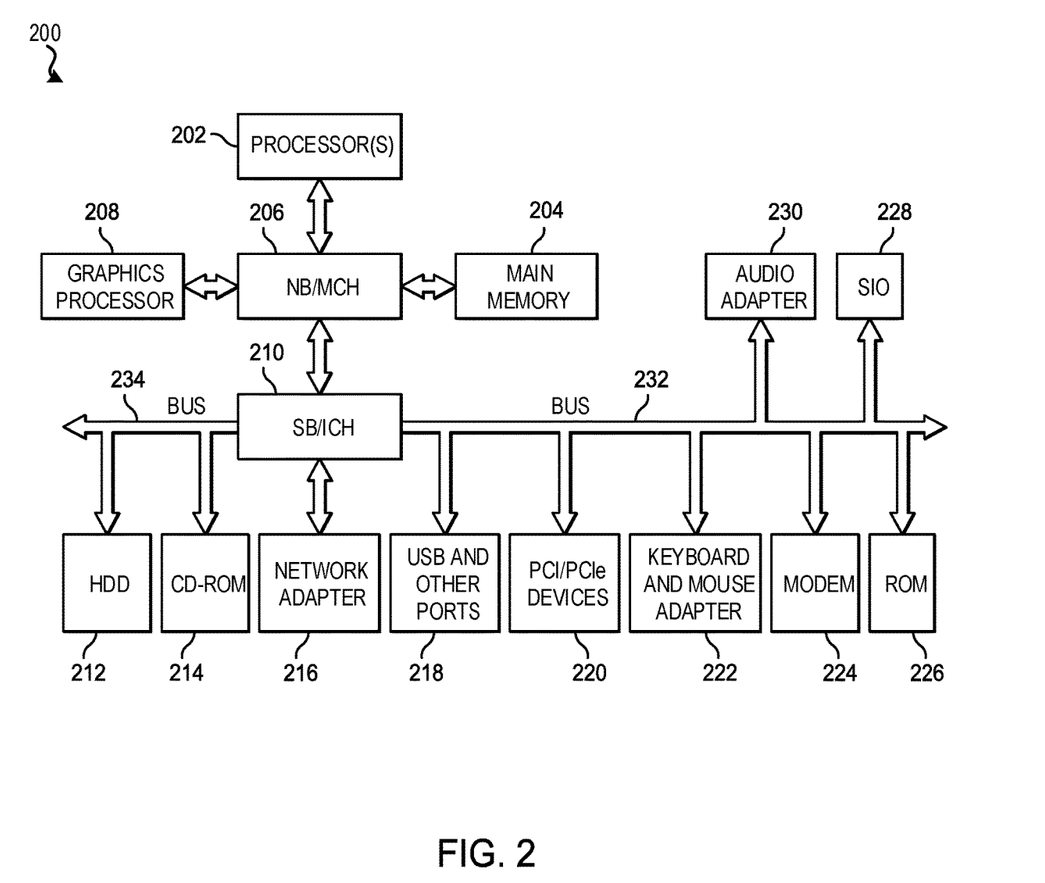
FIG. 2 is a block diagram illustrating a hardware architecture of a data processing system in accordance with aspects of the present disclosure.
Figure 3A:
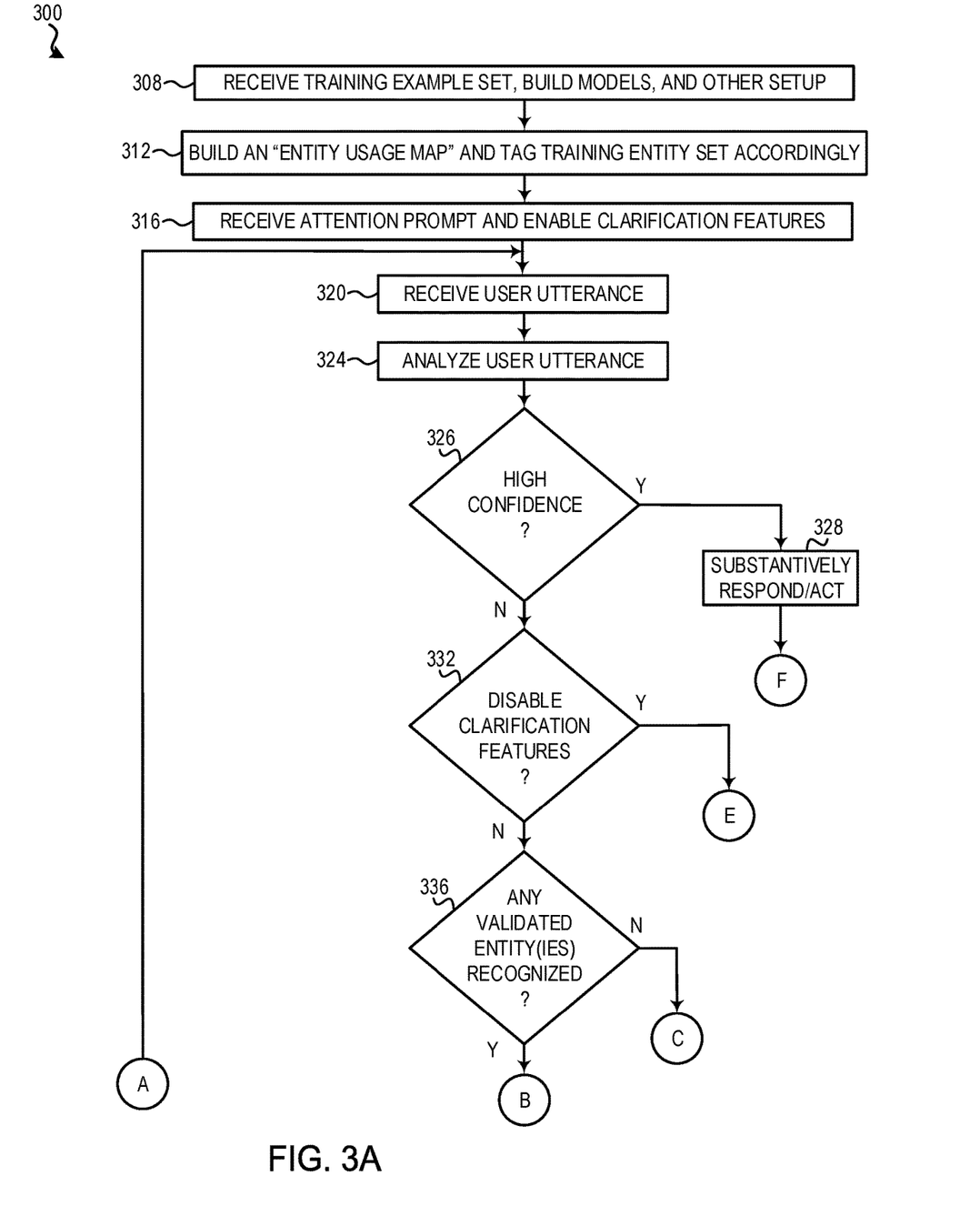
FIGS. 3A-3D are a flowchart illustrating a computer-implemented method for entity-level clarification in conversation services in accordance with aspects of the present disclosure.
Figure 3B:
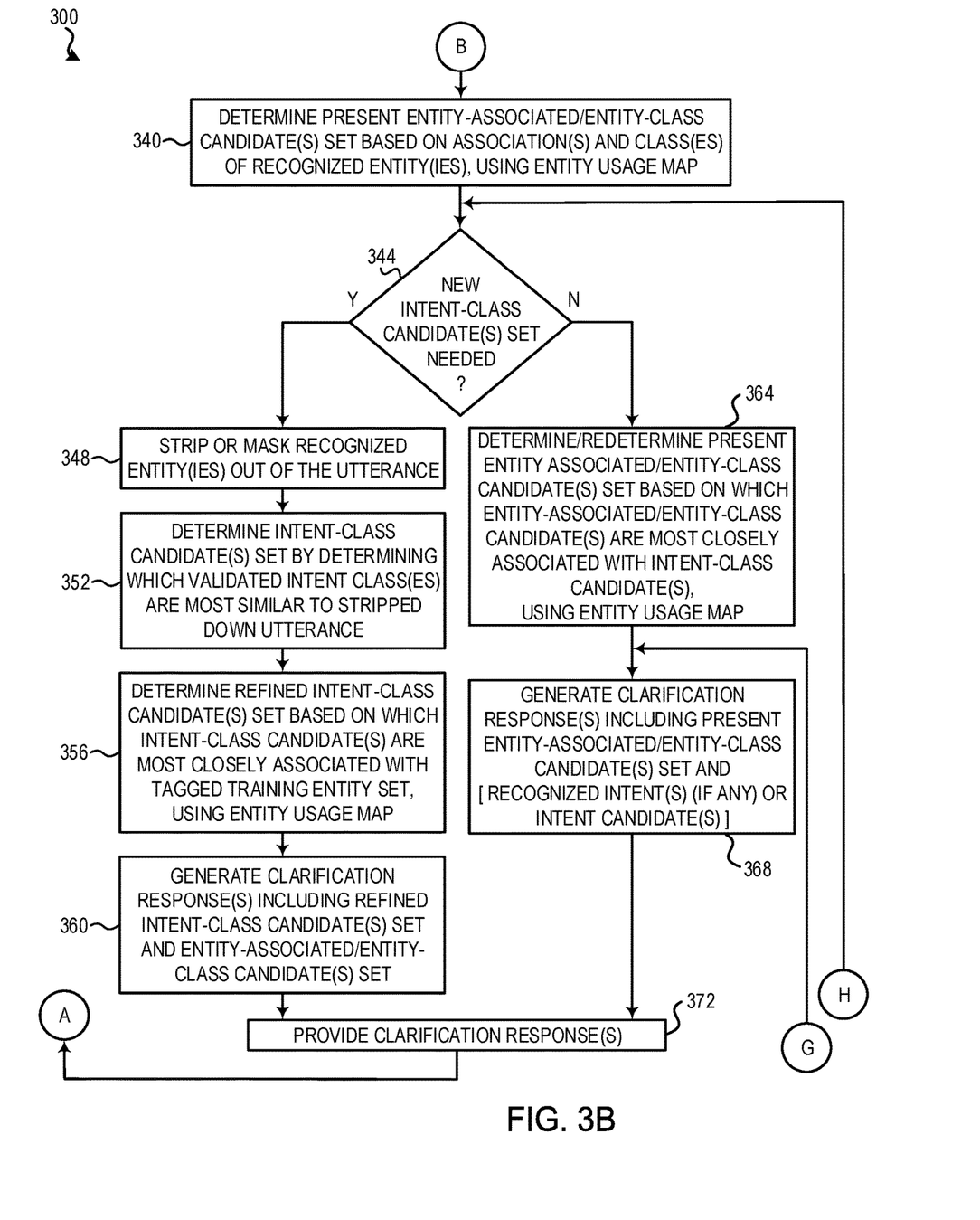
Figure 3C:
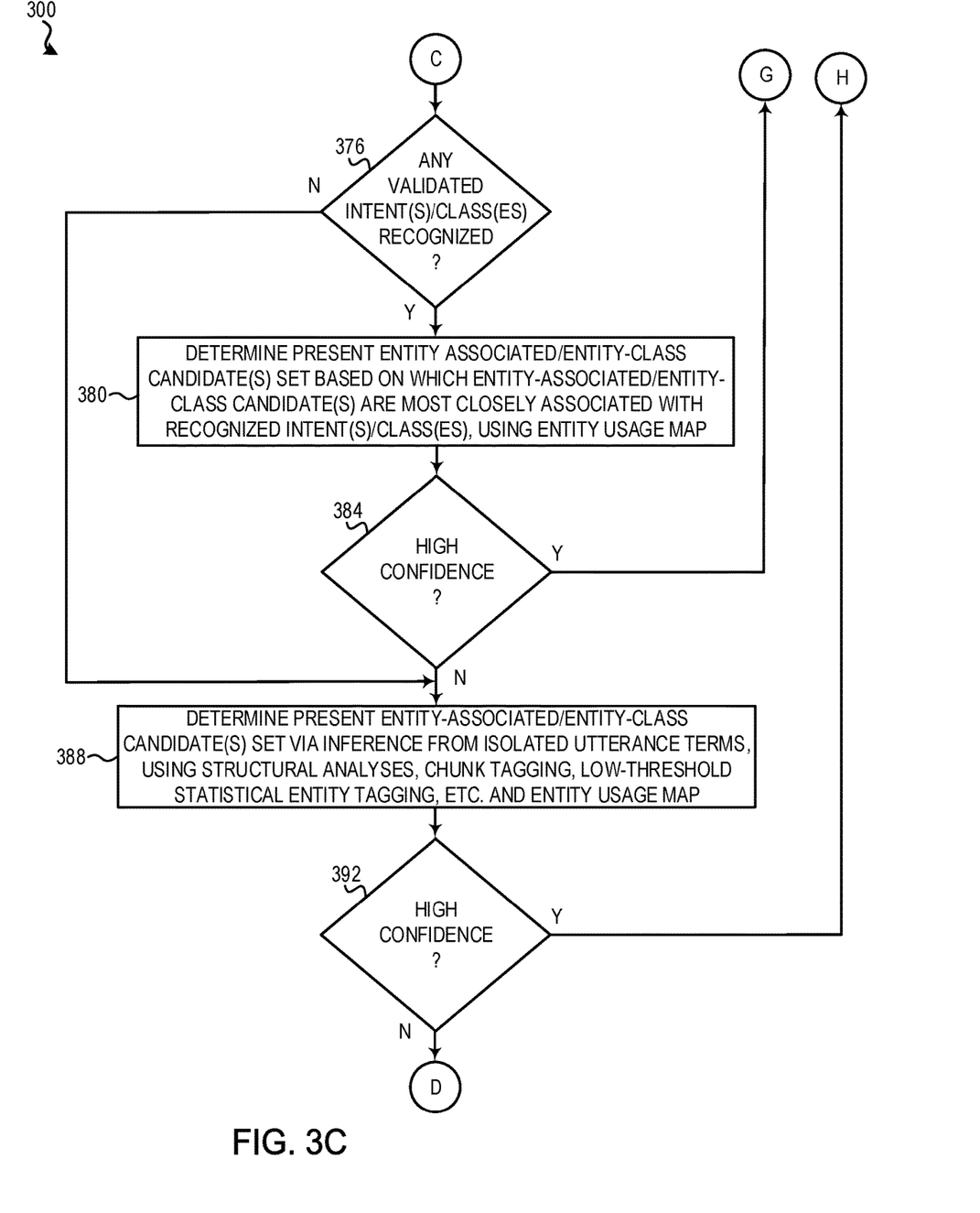
Figure 3D:
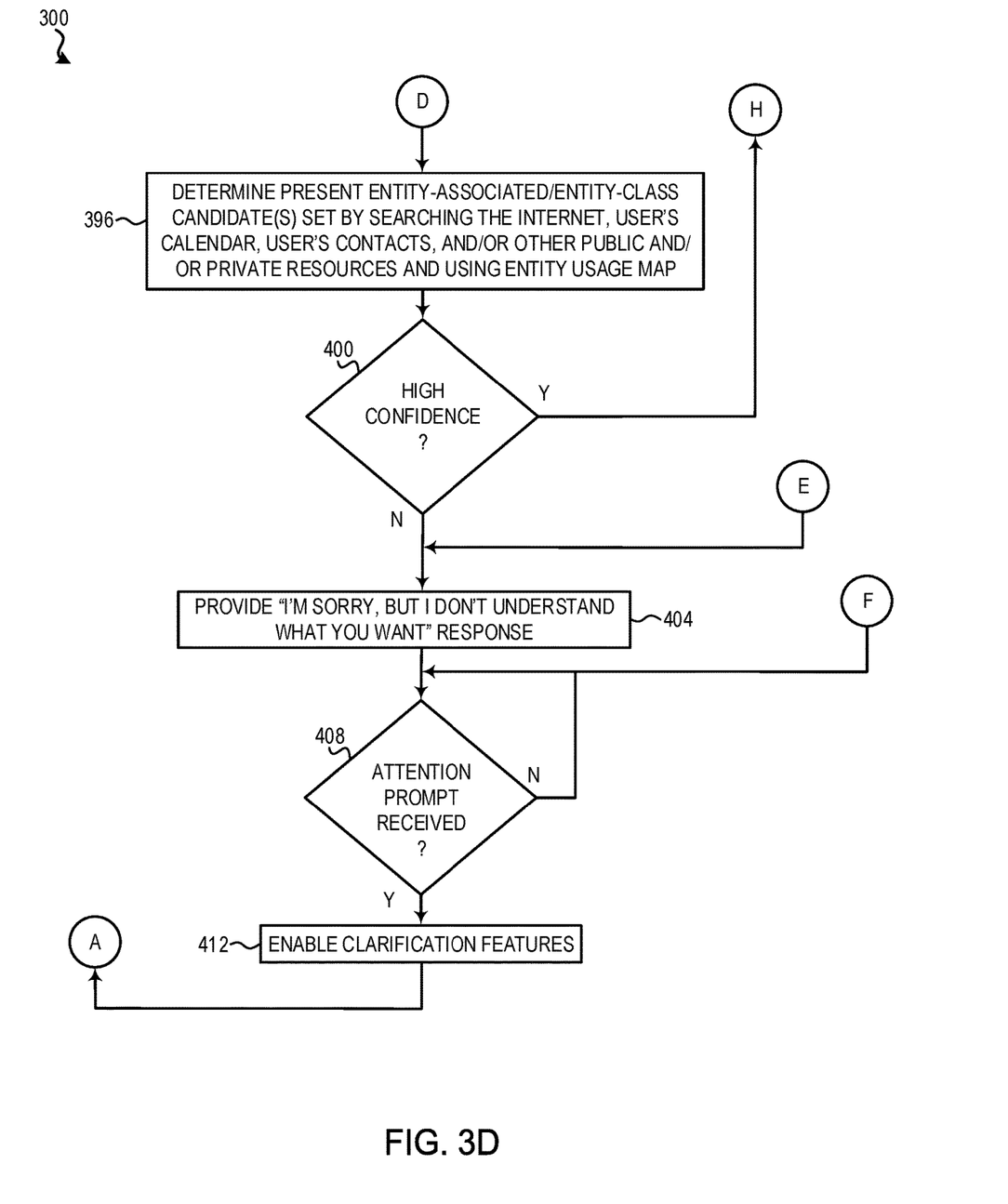

FIG. 2 is a block diagram illustrating a hardware architecture of a data processing system 200 in accordance with aspects of the present disclosure. In accordance with aspects of the present disclosure, the chatbot system 100 (depicted in FIG. 1) may be implemented using the data processing system 200. Additionally, the data processing system 200 may be configured to store and execute instructions for performing the method 300 (depicted in FIGS. 3A-3D) as well as the other processes described herein. In the depicted example, the data processing system 200 employs a hub architecture including north bridge and memory controller hub (NB/MCH) 206 and south bridge and input/output (I/O) controller hub (SB/ICH) 210. Processor(s) 202, main memory 204, and graphics processor 208 are connected to NB/MCH 206. Graphics processor 208 may be connected to NB/MCH 206 through an accelerated graphics port (AGP). A computer bus, such as bus 232 or bus 234, may be implemented using any type of communication fabric or architecture that provides for a transfer of data between different components or devices attached to the fabric or architecture.

In the depicted example, network adapter 216 connects to SB/ICH 210. Audio adapter 230, keyboard and mouse adapter 222, modem 224, read-only memory (ROM) 226, hard disk drive (HDD) 212, compact disk read-only memory (CD-ROM) drive 214, universal serial bus (USB) ports and other communication ports 218, and peripheral component interconnect/peripheral component interconnect express (PCI/PCIe) devices 220 connect to SB/ICH 210 through bus 232 and bus 234. PCI/PCIe devices may include, for example, Ethernet adapters, add-in cards, and personal computing (PC) cards for notebook computers. PCI uses a card bus controller, while PCIe does not. ROM 226 may be, for example, a flash basic input/output system (BIOS). Modem 224 or network adapter 216 may be used to transmit and receive data over a network.

HDD 212 and CD-ROM drive 214 connect to SB/ICH 210 through bus 234. HDD 212 and CD-ROM drive 214 may use, for example, an integrated drive electronics (IDE) or serial advanced technology attachment (SATA) interface. In accordance with aspects of the present disclosure, HDD 212 may be replaced by other forms of data storage devices including, but not limited to, solid-state drives (SSDs). A super I/O (SIO) device 228 may be connected to SB/ICH 210. SIO device 228 may be a chip on the motherboard that is configured to assist in performing less demanding controller functions for the SB/ICH 210 such as controlling a printer port, controlling a fan, and/or controlling the small light emitting diodes (LEDS) of the data processing system 200.

The data processing system 200 may include a single processor 202 or may include a plurality of processors 202. Additionally, processor(s) 202 may have multiple cores. In accordance with aspects of the present disclosure, data processing system 200 may employ a large number of processors 202 that include hundreds or thousands of processor cores. In accordance with aspects of the present disclosure, the processors 202 may be configured to perform a set of coordinated computations in parallel.

An operating system is executed on the data processing system 200 using the processor(s) 202. The operating system coordinates and provides control of various components within the data processing system 200 in FIG. 2. Various applications and services may run in conjunction with the operating system. Instructions for the operating system, applications, and other data are located on storage devices, such as one or more HDD 212, and may be loaded into main memory 204 for execution by processor(s) 202. In accordance with aspects of the present disclosure, additional instructions or data may be stored on one or more external devices. The processes described herein for the illustrative embodiments may be performed by processor(s) 202 using computer usable program code, which may be located in a memory such as, for example, main memory 204, ROM 226, or in one or more peripheral devices.

FIGS. 3A-3D are a flowchart illustrating a computer-implemented method 300 for entity-level clarification in conversation services in accordance with aspects of the present disclosure. The method 300 may be performed by the chatbot system 100 (depicted in FIG. 1). Accordingly, the following description of the method 300 is made with reference to operations and components of the chatbot system 100. Nevertheless, it should be appreciated that the method 300 is not limited to the chatbot system 100. The method 300 and/or any one or more of the particular steps of the method 300 may be performed by any other suitable device or system.

At step 308, the chatbot system 100 receives a training example set, builds operational models, and performs other setup and/or initiation functions. Step 308 may be performed at power up or after a hard reboot or reset, for example. In accordance with aspects of the present disclosure, at step 308 the chatbot system 100 receives the training examples in the form of text passages and documents from one or more of the knowledge bases 140 (via the network 136). The chatbot system 100 determines intents and entities from the training examples (referred to herein as "training intents" and "training entitites," respectively) and the user 152 uses the chatbot system 100 to map these training intents and training entities to desired responses of the chatbot system 100. The chatbot system 100 uses the training data and user specifications to build one or more of the conversation trees 124. As part of building the set of one or more conversation trees 124, the chatbot system 100 also classifies the training intents, generates corresponding training intent class designations, and tags the training intents with their class designations. For example, the linguistic analysis module 108 may determine, by analyzing the training example text passages and/or documents, that the terms "schedule," "reserve," and "book," notwithstanding their textual and audible differences, may be grouped into a common intent class, such as a "make an appointment" intent. Accordingly, the linguistic analysis module 108 may tag each of the terms with the #make_appointment designation. It should be appreciated that such classification can reduce the complexity of and enhance the efficiency of a conversation tree. Additionally, at step 308 the linguistic analysis module 108 supplements the training entities set (i.e., set of entities derived from the training samples) with variations designed to accommodate potential user misspellings/typos and/or mispronunciations. For example, the linguistic analysis module 108 may add the term "fullfill" (misspelled) to an entity set that includes "fulfill" to accommodate a potential misspelling in a textual request. After step 308, operations of the chatbot system 100 go to step 312.

At step 312, the chatbot system 100 builds a map of the usage of the training entities (determined at step 308). Building this map includes classifying the training entities (including any added/supplemental entities) and includes representing the training intents, the training intent classes, the training entities (including any added/supplemental entities), and the training entity classes with other data/knowledge so as to efficaciously actually or practically associate the intents, entities, classes, with each other and with an expanded body of data/knowledge. Such a map is referred to herein as an "entity usage map." The entity usage map may be implemented as an ontology, a knowledge graph, or any other suitable schema, and may incorporate data from and be stored in one or more of the knowledge bases 140. Step 312 may also include suitably tagging the training entities with useful information that may be made available by the entity usage map. After step 312, operations of the chatbot system 100 go to step 316.

At step 316, the chatbot system 100 receives an attention prompt from the user 152 (via one of the user devices 148 and the network 136). An attention prompt (such as "Watson™, I need you," "Hello, Alexa®," or "Hey, Siri®") lets the chatbot system 100 know that the user 152 wants to make a substantive request or have a substantive conversation. Also, at step 316 the chatbot system 100 enables various features of the method 300 by setting (or resetting) a suitable variable or flag to a true state (for example, CLARIFICATION_FLAG=1). After step 316, operations of the chatbot system 100 go to step 320.

At step 320, the chatbot system 100 receives a user utterance. In accordance with aspects of the present disclosure, step 320 may include receiving an audible user utterance via the speech recognition module 104. Alternatively to or in addition to receiving an audible user utterance, at step 320 the chatbot system 100 may receive a textual user utterance (and/or data representing a textual user utterance) from the network 136. After step 320, operations of the chatbot system 100 go to step 324.

At step 324, the chatbot system 100 analyzes the user utterance. In accordance with aspects of the present disclosure, step 324 includes the linguistic analysis module 108 analyzing the user utterance for intents and entities and providing such data to the conversation service module 112. Also, at step 324 the chatbot system 100 determines a confidence level or value that corresponds to a degree to which the chatbot system 100 can accurately, reliably, and/or otherwise suitably substantively respond or suitably substantively act on the user utterance. After step 324, operations of the chatbot system 100 go to step 326.

At step 326, the chatbot system 100 decides whether to substantively respond to or substantively act on the user utterance. In accordance with aspects of the present disclosure, the chatbot system 100 makes this decision by determining whether the confidence value (from step 324) exceeds a suitable threshold. And if the confidence value is suitably high, operations of the chatbot system 100 go to step 328. Otherwise, operations of the chatbot system 100 go to step 332.

At step 328, the chatbot system 100 substantively responds to or substantively acts on the user utterance as per an applicable one of the conversation trees 124. In accordance with aspects of the present disclosure, after each set of clarification responses that ultimately results in the chatbot system 100 providing a response or action other than the "I'm sorry, but I don't understand what you want" response (at step 404), the chatbot system 100 may ask the user and/or poll a user community or other group for indications (such as yes/no votes, thumbs-up/thumbs-down selections, etc.) of whether the response or action ultimately provided was indeed a good or suitable reaction to the user's original utterance. In accordance with such aspects, when the consensus is that the response or action was good, then the chatbot system 100 may add the original utterance and the ultimate response (and/or the determined associated intent(s) and entity(ies)) to the training data or other known body of knowledge data of the chatbot system 100 so that in the future the chatbot system 100 may respond to the original utterance without repeated clarification. After step 328, operations of the chatbot system 100 go to step 408.

At step 332, the chatbot system 100 determines whether to disable various features of the method 300. Disabling some features of the method 300 may move operations of the chatbot system 100 out of a potentially endless loop in the event that the chatbot system 100 cannot convince the user 152 to provide a substantively actionable utterance. In accordance with aspects of the present disclose, at step 332 the chatbot system 100 disables various features of the method 300 by setting (or clearing) a suitable variable or flag to a false state (for example, CLARIFICATION_FLAG=0) when the chatbot system 100 has provided the same clarification response 2 consecutive times since receiving an attention prompt (at step 316 or step 408) or has provided 10 consecutive clarification responses since receiving an attention prompt. In addition to or alternatively to such automatic disablement, the chatbot system 100 may provide options and corresponding inputs and outputs for allowing the user 152 to selectively disable features of the method 300. If the chatbot system 100 (or the user 152) disables features at step 332, then operations of the chatbot system 100 go to step 404. Otherwise, operations of the chatbot system 100 go to step 336.

At step 336, if the chatbot system 100 is able to recognize or identify one or more validated (i.e., trained, recognized, or otherwise known to the chatbot system 100) entities in the user utterance (or did so at step 324), then operations of the chatbot system 100 go to step 340. Otherwise, operations of the chatbot system 100 go to step 376.

At step 340, the chatbot system 100 determines, using the entity usage map (built at step 312), a present set of one or more entity-associated candidates and entity-class candidates, based on the mapped associations, relationships, etc. of these candidates with the entities recognized in the user utterance (at step 336 and/or step 324). For example, assume that the chatbot system 100 has received (at step 320) a user utterance like "How's the weather today in Polish?" and assume that the chatbot system 100 determined (at step 326) that the chatbot system 100 could not confidently respond (perhaps among other things, the chatbot system 100 was not trained (at step 308) to speak Polish). Continuing the example, further assume that, notwithstanding the inability of the chatbot system 100 to confidently respond to the user utterance, the training examples provided to the chatbot system 100 included a corpus of documents regarding the North American National Hockey League. Further assume that those documents included newspaper articles about a Polish speaking coach who used an electronic Polish-English-Polish translator to communicate with his team. Further assume, then, that the chatbot system 100 identified Polish as an entity during training—perhaps, for example, because the chatbot system 100 was trained to answer sports trivia questions. Further assume that the entity usage map includes a geographical information knowledge base that includes references to Poland and to Polish as a language that is spoken there. Then, continuing the example, in accordance with aspects of the present disclosure, at step 340 the chatbot system 100 uses a knowledge graph implementation of the entity usage map to determine that Polish is associated with Poland. Similarly, the chatbot system 100 also determines that Poland has cities and that a city may be classified as "location." So, in this example, at step 340 the chatbot system 100 determines that, even though "Poland" is not the "Polish" entity that the chatbot system 100 originally recognized (and could not respond to), "Poland" is nevertheless an associated, alternative entity. Such an associated, alternative entity is referred to herein as an "entity-associated candidate." And, continuing with the example, the chatbot system 100 determines "Polish" is associated with "Poland," which is in a "#location" entity class. Such an entity class is referred to herein as an "entity-class candidate." After step 340, operations of the chatbot system 100 go to step 344.

At step 344, the chatbot system 100 determines whether a new set of one or more intent-class candidates is required. As referred to herein, "intent-class candidate" means an intent class that is used to generate one or more clarification responses (discussed further below). In accordance with aspects of the present disclosure, when the chatbot system 100 has not determined any reliable intent classes by analyzing the user utterance (at step 324) and the chatbot system 100 has presented all of a particular set of intent-class candidates in one or more clarification responses (since the latest attention prompt, or clarification response restart (received at step 316)), the chatbot system 100 determines, at step 344, that a new set of one or more intent-class candidates is required. If the chatbot system 100 determines that a new set of one or more intent-class candidates is required, then operations of the chatbot system 100 go to step 348. Otherwise, operations of the chatbot system 100 go to step 364.

At step 348, the linguistic analysis module 108 strips the entities recognized in the user utterance out of the user utterance or masks these entities such that they will not be considered for further processing. For example, the chatbot system 100 may convert "How's the weather today in Polish?" to "How's the weather?" After step 348, operations of the chatbot system 100 go to step 352.

At step 352, the chatbot system 100 determines a set of one or more intent-class candidates by determining which validated (i.e., trained, recognized, or otherwise known to the chatbot system 100) intent class(es) is/are most similar to the stripped down utterance (from step 348). For example, from "How's the weather?" the chatbot system 100 may generate one or similar intent classes, such as #weather_forecast, #weather_events, #weather_history, #weather_comparison, etc. After step 352, operations of the chatbot system 100 go to step 356.

At step 356, the chatbot system 100 determines, using the entity usage map, a refined (or narrower) set of one or more intent-class candidates based on which intent-class candidate(s) (from step 352) are most closely associated with the tagged training entity set. For example, from intent-class candidates such as #weather_forecast, #weather_events, #weather_history, and #weather_comparison, the chatbot system 100 may determine that #weather_history and #weather_comparison are most closely associated with the entities from the examples that the chatbot system 100 was trained with. Thus, in this example the chatbot system 100 determines that the intent-class candidate(s) set is (#weather_history; #weather_comparison). After step 356, operations of the chatbot system 100 go to step 360.

At step 360, the chatbot system 100 generates one or more clarification responses that include/cover the refined intent-class candidate(s) (from step 356) and include/cover the entity-associated candidate(s) and the entity-class candidate(s) (from step 340). For example, in response a user utterance such as "How's the weather today in Polish?" some aspects of the chatbot system 100 may provide one or more clarification responses, such as:

"I can't give you the weather in Polish, but did you mean that you want the weather history for a location in Poland?"

"I can't give you the weather in Polish, but did you mean that you want to compare the weather in Poland to the weather in another location?"

"I don't quite understand what you're asking for, but can I give you the weather history for any particular location?"

"Did you mean that you wanted a weather comparison?"

After step 360, operations of the chatbot system 100 go to step 372.

At step 364, the chatbot system 100 determines (or re-determines), using the entity usage map, the present set of one or more entity-associated candidates and entity-class candidates based on which entity-associated candidates and entity-class candidates (from step 340) are most closely associated with the present intent-class candidate(s). At step 364, the present intent-class candidate(s) are the intent class(es) (if any) that the chatbot system 100 determined when the chatbot system 100 analyzed the user utterance (at step 324) or the member(s) of the refined set of intent-class candidates (from step 356). After step 364, operations of the chatbot system 100 go to step 368.

At step 368, the chatbot system 100 generates one or more clarification responses that include/cover the present intent-class candidate(s) (from step 364) and include/cover the present entity-associated candidate(s) and entity-class candidate(s) (from step 364, step 384, step 392 or step 400). After step 368, operations of the chatbot system 100 go to step 372.

At step 372, the chatbot system 100 provides the clarification response(s) (from step 360 or step 368) to the user 152. In accordance with aspects of the present disclosure, the chatbot system 100 may provide the clarification response(s) audibly (e.g., via the speech synthesis module 132). Alternatively to or in addition to providing the clarification response(s) via the speech synthesis module 132, the chatbot system 100 may provide the clarification response(s) such that the user 152 may see and/or hear the clarification response(s) via one of the user devices 148. After step 372, operations of the chatbot system 100 go to step 320.

At step 376, if the chatbot system 100 is able to recognize or identify any validated (i.e., trained, recognized, or otherwise known to the chatbot system 100) intent(s) and/or validated intent class(es) from the user utterance (or did so at step 324), then operations of the chatbot system 100 go to step 380. Otherwise, operations of the chatbot system 100 go to step 388.

At step 380, the chatbot system 100 determines, using the entity usage map, a present set of one or more entity-associated candidates and entity-class candidates (i.e., an "entity-associated/entity-class candidate(s) set") based on which validated (i.e., trained, recognized, or otherwise known to the chatbot system 100) entity(ies) are most closely associated with the validated intent(s) and/or validated intent class(es) (from step 376). At step 380, the chatbot system 100 also determines a confidence level or value that corresponds to an accuracy, reliability, and/or other similar quality characteristic of the present entity-associated/entity-class candidate(s) set. After step 380, operations of the chatbot system 100 go to step 384.

At step 384, the chatbot system 100 decides whether to use the present entity-associated/entity-class candidate(s) set (from step 380). In accordance with aspects of the present disclosure, the chatbot system 100 makes this decision by determining whether the confidence value (from step 380) exceeds a suitable threshold. And if the confidence value is suitably high, operations of the chatbot system 100 go to step 368. Otherwise, operations of the chatbot system 100 go to step 388.

At step 388, the chatbot system 100 determines a present entity-associated/entity-class candidate(s) set via inference from isolated terms of the user utterance, using the entity usage map and structural analyses, chunk tagging, low-threshold statistical entity tagging, and/or similar techniques. At step 388, the chatbot system 100 also determines a confidence level or value that corresponds to an accuracy, reliability, and/or other similar quality characteristic of the present entity-associated/entity-class candidate(s) set. After step 388, operations of the chatbot system 100 go to step 392.

At step 392, the chatbot system 100 decides whether to use the present entity-associated/entity-class candidate(s) set (from step 388). In accordance with aspects of the present disclosure, the chatbot system 100 makes this decision by determining whether the confidence value (from step 388) exceeds a suitable threshold. And if the confidence value is suitably high, operations of the chatbot system 100 go to step 344. Otherwise, operations of the chatbot system 100 go to step 396.

At step 396, the chatbot system 100 determines, using the entity usage map, a present entity-associated/entity-class candidate(s) set by searching the Internet, user's electronic calendar, user's electronic contacts information, and/or other public and/or private resources for references to text passages and/or other information related to the user utterance that may be used to deduce associations on/in the entity usage map. At step 396, the chatbot system 100 also determines a confidence level or value that corresponds to an accuracy, reliability, and/or other similar quality characteristic of the present entity-associated/entity-class candidate(s) set. After step 396, operations of the chatbot system 100 go to step 400.

At step 400, the chatbot system 100 decides whether to use the present entity-associated/entity-class candidate(s) set (from step 396). In accordance with aspects of the present disclosure, the chatbot system 100 makes this decision by determining whether the confidence value (from step 396) exceeds a suitable threshold. And if the confidence value is suitably high, operations of the chatbot system 100 go to step 344. Otherwise, operations of the chatbot system 100 go to step 404.

At step 404, the chatbot system 100 provides an "I'm sorry, but I don't understand what you want" or similar response to the user 152. In accordance with aspects of the present disclosure, the chatbot system 100 may provide the response audibly (e.g., via the speech synthesis module 132). Alternatively to or in addition to providing the response via the speech synthesis module 132, the chatbot system 100 may provide the response such that the user 152 may see and/or hear the response via one of the user devices 148. After step 404, operations of the chatbot system 100 go to step 408.

At step 408, the chatbot system 100 waits for an attention prompt. As described above, an attention prompt lets the chatbot system 100 know that the user 152 wants to make a substantive request or have a substantive conversation. If the chatbot system 100 receives an attention prompt, operations of the chatbot system 100 go to step 412. Otherwise, the chatbot system 100 continues (at step 408) to wait for an attention prompt.

At step 412, the chatbot system 100 enables various clarification features of the method 300 by setting (or resetting) a suitable variable or flag to a true state (for example, CLARIFICATION_FLAG=1). After step 412, operations of the chatbot system 100 go to step 320.

It should be appreciated that aspects of the present disclosure provide, among other things, enhanced anthropomorphism of a CDA and, thus, provide an improved user experience. It should also be appreciated that aspects of the present disclosure reduce needs to over-fit a CDA for handling near miss scenarios, in which an utterance may be close to, but not exactly identical to, an utterance that the CDA is capable of substantively responding to. It should also be appreciated that aspects of the present disclosure facilitate less complex and less time consuming CDA training, make for simpler conversation trees, and reduce likelihoods of failed conversation scenarios that may undesirably irritate users and require undesirably high amounts of development resources to mitigate.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for entity-level clarification in conversation services integrated in a chatbot system, the method comprising:
   receiving, by the chatbot system, a conversation services training example set from a knowledge base over a communication network;
   determining, by the chatbot system, training intents and training entities from the conversation services training example set;
   classifying, by the chatbot system, the training intents into a plurality of training intent classes; classifying, by the chatbot system, the training entities into a plurality of training entity classes;
   building, by the chatbot system, an entity usage map using the conversation services training example set, wherein the entity usage map links the training intents, the training entities, the plurality of training intent classes, and the plurality of training entity classes with each other; receiving, by the chatbot system, a user utterance;
   converting the user utterance to a digital form when the user utterance is received in analog form;
   determining an intent and entity in the user utterance; determining a confidence value corresponding to a degree to which the chatbot system can accurately respond to the user utterance;
   identifying, by the chatbot system, an entity-associated candidate associated with the entity corresponding to the user utterance, an entity-class candidate corresponding to the entity-associated candidate, and an intent-class candidate using the entity usage map when the confidence value does not satisfy a predetermined threshold value;

generating, by the chatbot system, a clarification response based on the entity-associated candidate, the entity-class candidate, and the intent-class candidate; and providing, by the chatbot system, the clarification response to a user;

wherein the method further, incrementing a clarification response counter;

disabling a feature of the chatbot system when the clarification response counter exceeds a predetermined threshold; and requesting the user to provide a rating of a quality of the clarification response to the user utterance, and using the rating of the quality of the clarification response to modify a future response to the user utterance.

2. The method of claim 1, wherein determining the intent-class candidate using the entity usage map excludes reliance on the recognized entity from determining the intent-class candidate using the entity usage map.

3. The method of claim 1, further comprising providing an option for the user to selectively disable features of the chatbot system when the clarification response counter exceeds a predetermined threshold.

4. The method of claim 1, further comprising:

failing to recognize any entities in the user utterance; and failing to recognize any intents of the user utterance concurrently with failing to recognize any entities in the user utterance, wherein, responsive to failing to recognize any intents of the user utterance concurrently with failing to recognize any entities in the user utterance, generating the clarification response using the entity usage map includes determining, using the entity usage map and a resource selected from the group consisting of isolated terms of the user utterance, the Internet, an electronic calendar of the user, and electronic contacts information of the user, a candidate selected from the group consisting of an entity-associated candidate and an entity-class candidate.

5. A chatbot system for entity-level clarification in conversation services, the system comprising:

a memory having instructions therein; and at least one processor in communication with the memory, wherein the at least one processor is configured to execute the instructions to:

receive a conversation services training example set from a knowledge base over a communication network, determine training intents and training entities from the conversation services training example set;

classify the training intents into a plurality of training intent classes; classify the training entities into a plurality of training entity classes;

build an entity usage map using the conversation services training example set, wherein the entity usage map links the training intents, the training entities, the plurality of training intent classes, and the plurality of training entity classes with each other, receive a user utterance, convert the user utterance to a digital form when the user utterance is received in analog form;

determine a confidence value corresponding to a degree to which an accurate response can be provided to the user utterance; identify an entity-associated candidate associated with the entity corresponding to the user utterance, an entity-class candidate corresponding to the entity-associated candidate, and an intent-class candidate using the entity usage map when the confidence value does not satisfy a predetermined threshold value;

generate a clarification response based on the entity-associated candidate, the entity-class candidate, and the intent-class candidate; and provide the clarification response to a user;

wherein the at least one processor is further configured to execute the instructions to:

increment a clarification response counter;

disable a feature when the clarification response counter exceeds a predetermined threshold; and request the user to provide a rating of a quality of the clarification response to the user utterance, and using the rating of the quality of the clarification response to modify a future response to the user utterance.

6. The system of claim 5, wherein the at least one processor is further configured to execute the instructions to exclude reliance on the recognized entity from determinations of the intent-class candidate.

7. The system of claim 5, wherein the at least one processor is further configured to execute the instructions to provide an option for the user to selectively disable features when the clarification response counter exceeds a predetermined threshold.

8. The system of claim 5, wherein the at least one processor is further configured to execute the instructions to, responsive to failing to recognize any intents of the user utterance concurrently with failing to recognize any entities in the user utterance, determine, using the entity usage map and a resource selected from the group consisting of isolated terms of the user utterance, the Internet, an electronic calendar of the user, and electronic contacts information of the user, a candidate selected from the group consisting of an entity-associated candidate and an entity-class candidate.

9. A computer program product for entity-level clarification in conversation services, the computer program product comprising a computer readable storage medium having program instructions embodied therewith, the program instructions executable by at least one processor to cause the at least one processor to:

receive a conversation services training example set from a knowledge base over a communication network, determine training intents and training entities from the conversation services training example set;

classify the training intents into a plurality of training intent classes;

classify the training entities into a plurality of training entity classes; build an entity usage map using the conversation services training example set, wherein the entity usage map links the training intents, the training entities, the plurality of training intent classes, and the plurality of training entity classes with each other, receive a user utterance, convert the user utterance to a digital form when the user utterance is received in analog form;

determine a confidence value corresponding to a degree to which an accurate response can be provided to the user utterance;

identify an entity-associated candidate associated with the entity corresponding to the user utterance, an entity-class candidate corresponding to the entity-associated candidate, and an intent-class candidate using the entity usage map when the confidence value does not satisfy a predetermined threshold value;

generate a clarification response based on the entity-associated candidate, the entity-class candidate, and the intent-class candidate; and provide the clarification response to a user;

wherein the program instructions are further executable by the at least one processor to cause the at least one processor to:

increment a clarification response counter;

disable a feature when the clarification response counter exceeds a predetermined threshold; and request the user to provide a rating of a quality of the clarification response to the user utterance, and using the rating of the quality of the clarification response to modify a future response to the user utterance.

10. The computer program product of claim 9, wherein the program instructions are further executable by the at least one processor to cause the at least one processor to provide an option for the user to selectively disable features when the clarification response counter exceeds a predetermined threshold.

11. The computer program product of claim 9, wherein the program instructions are further executable by the at least one processor to cause the at least one processor to, responsive to failing to recognize any intents of the user utterance concurrently with failing to recognize any entities in the user utterance, determine, using the entity usage map and a resource selected from the group consisting of isolated terms of the user utterance, the Internet, an electronic calendar of the user, and electronic contacts information of the user, a candidate selected from the group consisting of an entity-associated candidate and an entity-class candidate.

* * * * *